United States Patent
Kranicz et al.

(10) Patent No.: US 10,898,906 B2
(45) Date of Patent: Jan. 26, 2021

(54) CENTRIFUGE AND CONTROL METHOD THEREFOR, COMPUTER PROGRAM CARRYING OUT THE METHOD

(71) Applicant: 77 Elektronika Muszeripari KFT., Budapest (HU)

(72) Inventors: Tunde Kranicz, Budapest (HU); Karoly Kunstar, Pecel (HU)

(73) Assignee: 77 Elektronika Muszeripari KFT, Budapest (HU)

( * ) Notice: Subject to any disclaimer, the term of this patent is extended or adjusted under 35 U.S.C. 154(b) by 0 days.

(21) Appl. No.: 16/762,787

(22) PCT Filed: Nov. 14, 2018

(86) PCT No.: PCT/HU2018/000050
§ 371 (c)(1),
(2) Date: May 8, 2020

(87) PCT Pub. No.: WO2019/097268
PCT Pub. Date: May 23, 2019

(65) Prior Publication Data
US 2020/0331006 A1    Oct. 22, 2020

(30) Foreign Application Priority Data

Nov. 20, 2017  (HU) .................................. 1700479
Jun. 8, 2018   (HU) .................................. 1800197

(51) Int. Cl.
*B04B 9/10*    (2006.01)
*B04B 9/02*    (2006.01)
(Continued)

(52) U.S. Cl.
CPC .................. *B04B 9/10* (2013.01); *B04B 9/02* (2013.01); *B04B 13/00* (2013.01); *H02P 6/153* (2016.02)

(58) Field of Classification Search
CPC .. B04B 9/10; B04B 9/02; B04B 13/00; H02P 6/153
See application file for complete search history.

(56) References Cited

U.S. PATENT DOCUMENTS 4,241,866 A * 12/1980 Giesbert ................... B04B 9/10
                                                         494/37
5,014,336 A    5/1991 Grassl
(Continued)

FOREIGN PATENT DOCUMENTS

DE        19632965 A1 *  2/1998
FR    WO 2013156136 A1   10/2013
(Continued)

OTHER PUBLICATIONS

International Search Report corresponding to PCT application PCT/HU2018/000050, dated Apr. 12, 2019 (3 pages).
(Continued)

*Primary Examiner* — Charles Cooley
(74) *Attorney, Agent, or Firm* — Maginot Moore & Beck LLP

(57) ABSTRACT

A control method for a centrifuge is performed by a motor drive unit to drive a motor of the centrifuge using pulses from an angle sensor. The method has a start phase, a regulated acceleration phase, a holding phase, a regulated deceleration phase, a regulated gentle deceleration phase, and a position adjustment phase.

11 Claims, 4 Drawing Sheets

(51) Int. Cl.
   *B04B 13/00*      (2006.01)
   *H02P 6/15*       (2016.01)

(56)          References Cited

U.S. PATENT DOCUMENTS 6,204,627  B1 *   3/2001   Watanabe ................ B04B 9/10
                                                         318/729
   2005/0007046 A1 * 1/2005   Schneider ............... H02P 29/10
                                                         318/268
   2005/0258789 A1   11/2005  Getz
   2014/0271237 A1   9/2014   Kozaki
   2015/0194913 A1 * 7/2015   Hessler .................. H02P 23/26
                                                         318/759
   2020/0047191 A1 * 2/2020   Li ........................... B04B 9/12
   2020/0331006 A1 * 10/2020  Kranicz ................ B04B 13/00

FOREIGN PATENT DOCUMENTS

JP    WO 2012070275 A1    5/2012
   WO    WO-2013156136 A1 *  10/2013   ............... B04B 9/10

OTHER PUBLICATIONS

International Preliminary Report on Patentability corresponding to PCT application PCT/HU2018/000050, dated Mar. 12, 2020 (26 pages).

* cited by examiner

CENTRIFUGE AND CONTROL METHOD THEREFOR, COMPUTER PROGRAM CARRYING OUT THE METHOD

This application is a 35 U.S.C. § 371 National Stage Application of PCT/HU2018/000050, filed on Nov. 14, 2018, which claims the benefit of priority to Serial No. P1800197, filed on Jun. 8, 2018 in Hungary and to Serial No. P1700479, filed on Nov. 20, 2017, the disclosures of which are incorporated herein by reference in their entireties.

TECHNICAL FIELD

This disclosure relates to a centrifuge and to a control method therefor, as well as to a computer program carrying out the method and to a storage medium. The disclosure is preferably but not exclusively suitable for centrifuging a cuvette containing a body fluid, wherein a special stopping ensures that a distribution of a sediment in the cuvette remains homogenous.

BACKGROUND ART

U.S. Pat. No. 4,241,866 discloses a general idea that in certain applications the centrifuge motor must be gently braked. In the solution described in DE 41 16 313 C2 a DC servomotor is used for driving a centrifuge, and the drive uses a feedback control. U.S. Pat. No. 5,485,066 describes a sequence of a centrifuge motor control. However, in all these documents, on the one hand the solutions presented for motor control, acceleration and braking are complicated and costly to implement, and on the other hand they provide solutions that cannot be applied for example for the special purpose mentioned in the introduction. U.S. Pat. No. 5,014,336, US 2014/271237 A1, WO 2013/156136 A1, WO 2012/070275 A1 and US 2005/0258789 A1 also disclose the general background art of motor control.

SUMMARY

An object of the disclosure is to provide a centrifuge and control method, as well as to provide a computer program and a storage medium therefor, which enable an efficient centrifugation according to a predetermined series of steps, and then a special stopping with a predetermined deceleration and without jerks in an accurate position. Stopping in an accurate position facilitates an efficient transport of the centrifuged object, for example a cuvette, to an examination unit.

A further object of the disclosure is to provide a solution in the fields mentioned above which even in the case of a simply designed centrifuge drive can be applied efficiently. Namely, we have recognised that if the pulses of an angle sensor coupled (e.g. directly to the motor axle or indirectly) to the motor are used for control in various phases of the centrifugation in different ways, then the objects of the disclosure can be efficiently achieved. The angle sensor emits pulses in predetermined divisions when turning round. As an example, the angle sensor may output 200 pulses for each turnaround, which means that a pulse is outputted at each 1.8°. On the one hand, these pulses can be counted, and as a result of this counting, the actual position of the turnaround can be obtained, and on the other hand, the time difference between pulses may also be used for control, and by this the speed of rotation can be determined. The recognition leading to the disclosure was that by means of these two parameters carried by the pulses, by using one or both parameters with appropriate functions in each phase, a cost efficiently implemented, safe and precise centrifuge control can be achieved.

The objects of the disclosure have been achieved by the control method, by the centrifuge, by the computer program, and by the storage medium as set forth below.

BRIEF DESCRIPTION OF THE DRAWINGS

Preferred embodiments of the disclosure are described below by way of example with reference to the following drawings, where.

DETAILED DESCRIPTION

In the detailed description of embodiments, the disclosure describes primarily embodiments in which a DC motor is used in the centrifuge. However, the disclosure is not limited to this embodiment, but in principle the disclosure can be used for any motor type, for example also in the case of an AC, a BLDC or a stepping motor. Therefore, the phases and considerations of the disclosure may be applied for these further motor types, but in the case of these motors other types of motor drive units and control signals are required, as known from the prior art and as conceivable for a skilled person. The various phases of the control sequence according to the disclosure can be implemented with different complexities for the various types of motors. Generally, it can be said that in the case of a DC motor, except for the last phase, all the control phases are very simple to implement. In the very last phase, an exact positioning of the motor is to be carried out, which can be executed extremely simply in case of a stepping motor, but in the case of a DC motor, special measures will be necessary as detailed later on. It is to be noted that in the case of the stepping motor, the first phases of the control sequence can be implemented with a relatively higher complexity and difficulty.

In the embodiment to be described in details, furthermore, the control signal outputted by the controller is a pulse width modulation (PWM) signal and the value of the control signal is a digital value. The latter may be a one byte or even a multibyte digital value; we concluded during our experiments that even a one byte digital value (ranging from 0 to 255) achieves an appropriate precision in most applications. It is a great advantage of the PWM signal that a D/A converter is not required in the system and that in the last control phase the output frequency of the PWM signal falling into a MHz magnitude is suitable for implementing the AC signal to be described later on. Another applicable approach is that the control unit outputs an analogue signal instead of the digital one, for example a signal between 0 V and 5 V, to the motor drive unit. In the latter case, a separate signal switchover solution is to be implemented for the AC signal advantageously applicable in the last phase.

Figure 1:
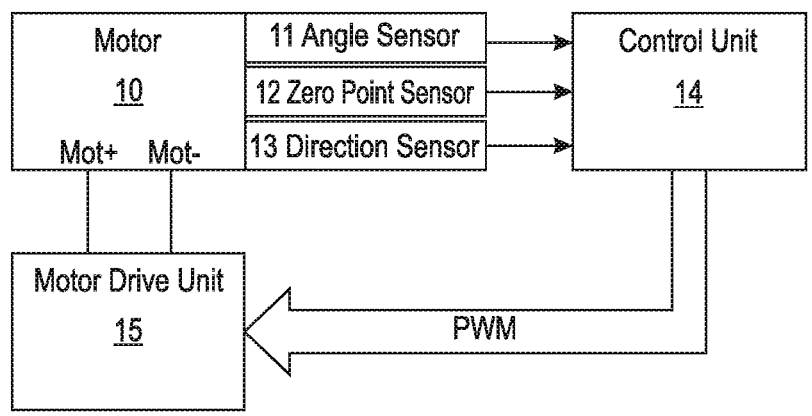
FIG. 1 is a block diagram of a centrifuge motor control according to the disclosure.

According to the block diagram shown in FIG. 1, a motor 10 of the centrifuge (not shown) is driven by a motor drive unit 15, which receives the control signal that defines the desired motion of the centrifuge. In the control method, pulses of an angle sensor 11 coupled to the motor 10 are applied.

A zero-point sensor 12 is preferably also coupled to the motor 10, and this sensor functions once in every revolution, and by this the absolute zero point position can be determined. Preferably, this can be used for an appropriate initial positioning of the centrifugation. In the given case, a direction sensor 13 may also be coupled to the motor, and by means of this, the direction of rotation can be determined.

Figure 2:
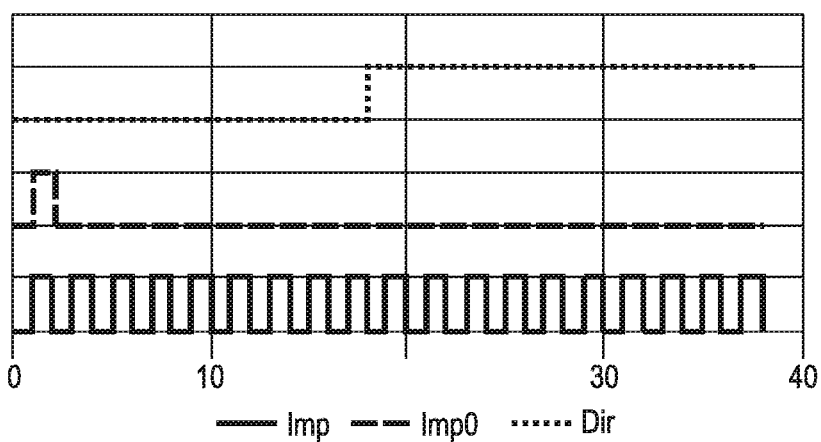
FIG. 2 is a diagram showing time-related changes of signal shapes of sensors associated with the motor.

FIG. 2 shows signal shapes of the sensors on a time axis. At the top an output signal Dir of the direction sensor 13 is shown with a dotted line; the output signal assumes the appropriate value of the two possible values subject to the actual direction. In the centre of the diagram a change in the direction of rotation is depicted. In the centre, a dashed line shows the output signal Imp0 of the zero-point sensor 12, and the output signal comprises one pulse for each revolution. At the bottom of the diagram, the output signal Imp of the angle sensor 11 is shown with a continuous line; this comprises one pulse for each defined angular displacement, for example at each 1.8°. Preferably, the angle sensor 11 is an incremental angle sensor, i.e. it only provides pulses, and does not indicate the absolute position—this results in a cost-efficient approach, in which the absolute position can be tracked by counting the pulses. However, according to the disclosure, pulse-emitting absolute angle sensors may also be applied for this purpose.

In the following, the phases of the control sequence, i.e. the consecutive phases from a starting to a stopping of the centrifuge as well as an additional initiating phase will be described by formulae. The explanation of constants and values in the formulae and their advisable extreme values are given in Table 1 at the end of the description.

At the ends of each phase, the centrifuge should be in a specified position, approximately with a specified speed of rotation. Preferably, the duration of each phase is also determined with the number of pulses in the given phase, and switching to the next phase is carried out when reaching the given number of pulses.

The so-called initiating phase is not necessarily part of the control sequence according to the disclosure. This phase may be inserted at the beginning of each control sequence, but it is preferably carried out once when the given equipment is switched on, or even from time to time regularly, for determining the appropriate initiating values. The initiation is carried out preferably in a way that the centrifuge does not necessarily holds the object to be centrifuged, for example a cuvette filled up with body fluid. This is because the mass of the latter object is usually negligible compared to the mechanical inertia of the centrifuge. In this way the initiation does not necessitate the filling in and wasting of an object to be centrifuged.

Initiating Phase (Phase 0)

In this phase a Pwm value is measured in association with
  an initial rotation defined by $t_{minrot}$ (i.e. with the slowest initial rotation); which will be the value Pwmmin; and
  a centrifugation speed determined by $t_{cent}$; which will be the value $Pwm_{ncent}$.

The measurement is carried out in a way that the digital value Pwm is increased from 0, and as soon as the following inequalities are met, the actual Pwm value is recorded as the given value.

If $\Delta t_i < t_{minrot}$ then $Pwmmin = Pwm$

If $\Delta t_i < t_{cent}$ then $Pwm_{ncent} = Pwm$

Starting Phase

In this phase there is no regulating, because the pulses are received too rarely for this. This phase lasts until $X_{start}$ pulses; the driving signal of the motor, i.e. the value of the control signal is exclusively calculated from the position. Therefore, in the starting phase, the value of the control signal is determined on the basis of the position defined by the pulses of the angle sensor 11 according to the following equations:

$$Pwmmot = \text{fpwmmot\_SP}(i)$$

$$i = \sum_{n=1}^{X_{start}} imp$$

$$\text{fpwmmot\_SP}(0) = Pwmmin$$

where
  Pwmmot is the value of the control signal,
  i is a sum of pulses (imp) detected from the starting up to an actual position, fpwmmot_SP is a function determining the value of the control signal in the starting phase,
  $X_{start}$ is a length of the starting phase measured in pulses, and
  Pwmmin is a control signal value associated with an initial rotation.

The function fpwmmot_SP preferably determines the value of the control signal in a way that starting from the initial value Pwmmin, the value of the control signal is increased (e.g. by 1) upon each pulse until the time difference between the last two pulses drops to below a limit ($t_{Max}$):

If $\Delta t_i < t_{Max}$ then $fpwmmot\_SP(i) = fpwmmot\_SP(i-1)$

If $\Delta t_i \geq t_{Max}$ then $fpwmmot\_SP(i) = fpwmmot\_SP(i-1)+1$ where $t_{Max}$ is a time elapsing between two pulses associated with the desired maximum rotation in the starting phase.

The function fpwmmot_SP, just like the other preferred functions to be detailed later, can be a different function as well, which is to be tuned and pre-parameterised preferably by experiments according to the appropriate centrifuge behaviour necessary for the actual application. On the basis of the control sequence and of the control types characterising each phase according to our disclosure, a person skilled in the art can create these functions on the basis of the discussion above.

Regulated Acceleration Phase

In this phase, the rotation value of ncent is achieved by a uniform acceleration in a regulated way during the time $t_{accel}$. On average, the value of ncent/2 revolutions/min is realized, and this phase lasts $X_{accel}$ pulses. In the regulated acceleration phase, the value of the control signal is determined on the basis of the value of a set-value function determined by the position, and the time difference between the pulses, according to the following equations:

$$Pwmmot = fpwmmot\_AP(fsetvalue\_AP(i), \Delta t_i)$$

$$\Delta t_i = t_i - t_{i-1}$$

where fpwmmot_AP is a function determining the value of the control signal in the regulated acceleration phase, fsetvalue_AP is the set-value function of the regulated acceleration, and $\Delta t_i$ is the time elapsed between an actual pulse and the previous pulse.

In the regulated acceleration phase, the value of the control signal is preferably determined by the function fpwmmot_AP as follows:

$$fsetvalue\_AP(i) = Setvalue_{offs} + (Setvalue_{amp}/i)$$

$$t_{i_{error}} = \Delta t_i - fsetvalue\_AP(i)$$

Turns faster than the calculated value: If $t_{i_{error}} < 0$ then $$fpwmmot\_AP(i) = \frac{i}{Setvalue_{div1}} + \left(\frac{t_{i_{error}}}{\frac{X_{accelH} - i}{Div_{accelH}}}\right)$$

Turns slower than the calculated value: If $t_{i_{error}} \geq 0$ then $$fpwmmot\_AP(i) = \frac{i}{Setvalue_{div2}} + \left(\frac{t_{i_{error}}}{\frac{X_{accelL} - i}{Div_{accelL}}}\right)$$

where the constants in the formulae are the following:

$Setvalue_{offs}$ is an offset of the regulated acceleration set-value calculation, $Setvalue_{amp}$ is an amplification of the regulated acceleration set-value calculation, $Setvalue_{div1}$ is a set-value divisor of the regulated acceleration pwm calculation, $Setvalue_{div2}$ is a set-value divisor of the regulated acceleration pwm calculation, $X_{accelH}$ is a base value of the position of the regulated acceleration pwm calculation, $X_{accelL}$ is a base value of the position of the regulated acceleration pwm calculation, $Div_{accelH}$ is an error signal divisor of the regulated acceleration pwm calculation, $Div_{accelL}$ is an error signal divisor of the regulated acceleration pwm calculation.

As shown in the formulae above, a simple P (proportional) regulation is sufficient, and the I (integral) and the D (derivative) parts are not needed. This is valid for all the following regulating functions. This result is unexpected and surprising, in view of the fact that in high speed applications like for example in centrifuge controls, the application of the D part which caters for rapid intervention and of the equalising I part is part of an engineer's mindset.

Holding Phase

In this phase, the rotation speed ncent is held for the time period $t_{centhold}$; the phase lasts $X_{hold}$ pulses. Therefore, in the holding phase, a predetermined centrifugation speed is held, where the value of control signal is determined on the basis of the time difference between the pulses according to the following equation:

$$Pwmmot = fpwmmot\_HP(\Delta t_i)$$

where fpwmmot_HP is a function determining the value of control signal in the holding phase. In the holding phase the function fpwmmot_HP preferably determines the value of the control signal according to the following equations:

$$t_{i_{error}} = \Delta t_i - t_{hold}$$

$$fpwmmot\_HP(i) = Hold_{amp} * t_{i_{error}} + Pwm_{ncent}$$

where the constants in the formulae are the following:

$t_{hold}$ is a time interval of pulses associated with a stabilised holding centrifugation speed, measured in a processor clock signal, $Hold_{amp}$ is an amplification of an error signal associated with the stabilised holding centrifugation speed, $Pwm_{ncent}$ is a control signal value associated with the stabilised holding centrifugation speed.

Regulated Deceleration Phase

In this phase the speed is preferably decreased to the minimum by uniform deceleration. The phase lasts $X_{decel1}$ pulses. In the regulated deceleration phase, the value of the control signal is determined on the basis of the value of a set-value function determined by the position and the time difference between pulses, in accordance with the following equation:

$$Pwmmot = fpwmmot\_DP(fsetvalue\_DP(i), \Delta t_i)$$

where fpwmmot_DP is a function determining the value of the control signal in the regulated deceleration phase, and fsetvalue_DP is the set-value function of the regulated deceleration. In the regulated deceleration phase, a function fpwmmot_DP preferably determines the value of the control signal according to the following equations:

$$\Delta t_i = t_i - t_{i-1}$$

$$fsetvalue\_DP(i) = t_{hold} + \left(\frac{Setvalue_{ampdecel1}}{X_{decel1} - i}\right)$$

$$t_{i_{error}} = \Delta t_i - fsetvalue\_DP(i)$$

Turns faster than the calculated value: If $t_{i_{error}} < 0$ then $$fpwmmot\_DP(i) = \frac{i}{Setvalue_{div1l1}} + \left(\frac{t_{i_{error}}}{\frac{i}{Div_{decel1H}}}\right)$$

Turns slower than the calculated value: If $t_{i_{error}} \geq 0$ then $$fpwmmot\_DP(i) = \frac{i}{Setvalue_{div2l1}} + \left(\frac{t_{i_{error}}}{\frac{i}{Div_{decel1L}}}\right)$$

where the constants in the formulae are the following:

$X_{decel1}$ is a time of the deceleration phase measured in pulses, $Setvalue_{ampdecel1}$ is a set-value amplification of the deceleration phase, $Setvalue_{div1l1}$ is a set-value divisor of the deceleration phase pwm calculation, $Setvalue_{div2l1}$ is a set-value divisor of the deceleration phase pwm calculation, $Div_{decel1H}$ is an error signal divisor of the deceleration phase pwm calculation, $Div_{decel1L}$ is an error signal divisor of the deceleration phase pwm calculation.

Regulated Gentle Deceleration Phase

In this phase, the position and the speed must also be correct to make sure that position regulation functions precisely without jerks. The phase lasts $X_{decel2}$ pulses. In this phase, the pulses arrive more rarely, and they cannot be regulated in the same way as in the previous phases. The time difference between the pulses will be taken into consideration with a lower weight. In the regulated gentle deceleration phase, the value of the control signal is thus determined on the basis of a value of a set-value function determined by the position, and the time difference between the pulses, where the time difference is considered with a lower weight in comparison with the regulated deceleration phase, according to the following equations:

$$Pwmmot = \text{fpwmmot\_GDP}(\text{fsetvalue\_GDP}(i), \Delta t_{i\_GDP})$$

$$\Delta t_{i\_GDP} = \frac{(t_i - t_{i-1})}{Div_{decel2}}$$

where fpwmmot_GDP is a function determining the value of the control signal in the regulated gentle deceleration phase, fsetvalue_GDP is the set-value function of the regulated gentle deceleration, and $\Delta t_{i\_GDP}$ is the quotient of the time difference between an actual pulse and the previous pulse and a $Div_{decel2}$ constant which is higher than one.

In the regulated gentle deceleration phase, the function fpwmmot_GDP determines the value of the control signal preferably as follows:

$$\text{fsetvalue\_GDP}(i) = \left( \frac{Setvalue_{ampdecel2}}{Setvalue_{offdecel2} - \frac{i}{Div_{decel2sv}}} \right)$$

$$t_{i_{hiba}} = \Delta t_{i\_GDP} - \text{fsetvalue\_GDP}(i)$$

$$\text{fpwmmot\_GDP}(i) = \left( \frac{t_{i_{error}}}{1 + \frac{i}{Div_{decel2pwm}}} \right)$$

where the constants in the formulae are the following:

$Setvalue_{ampdecel2}$ is a set-value multiplier of the gentle deceleration phase, $Setvalue_{offsdecel2}$ is a set-value offset of the gentle deceleration phase, $Div_{decel2sv}$ is a set-value pulse divisor of the gentle deceleration phase, $Div_{decel2pwm}$ is a pwm divisor of the gentle deceleration phase.

Position Adjustment Phase

Now the desired stopping position is generally within one turn, preferably within a quarter of a turn. Now the arm is set at a zero position with a minimal jerk. In this phase, there is only position-based control; in the position adjustment phase the value of the control signal is determined on the basis of the position according to the following equation $$Pwmacmot = \text{fpwmacmot}(i)$$

where

Pwmacmot is a value of the control signal in the position adjustment phase, and fpwmacmot is a function determining the value of the control signal in the position adjustment phase.

In the position adjustment phase, the function fpwmacmot determines the value of the control signal preferably as follows:

$$\text{fpwmacmot}(0) = Pwm_{Start}$$

$$\text{fpwmmot}(i) = Pwm_{decel3} - i \cdot Setvalue_{ampdecel3}$$

where the constants in the formulae are the following:

$Pwm_{Start}$ is an initial pwm signal of the position adjustment phase, $Pwm_{decel3}$ is a pwm offset of the position adjustment phase, $Setvalue_{ampdecel3}$ is an amplification of the position adjustment phase.

Figure 3A:
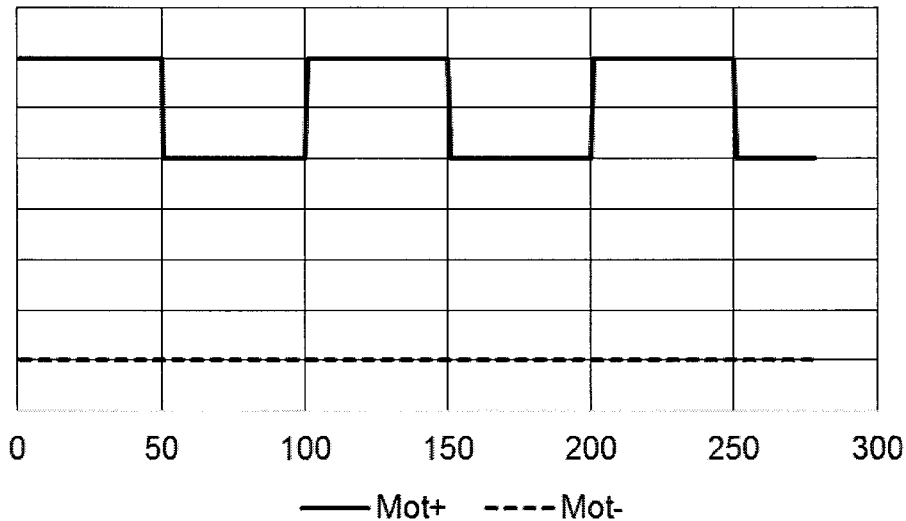
FIGS. 3A to 3C are signal shapes with various pulse widths which may be used for example in the first five phases of the method according to the disclosure and outputted by the motor drive unit shown in FIG. 1, and FIGS. 4A to 4C are diagrams showing exemplary signal shapes with various duty cycles that can be applied in the sixth phase of the control method according to the disclosure and outputted by the motor drive unit.
Figure 3B:
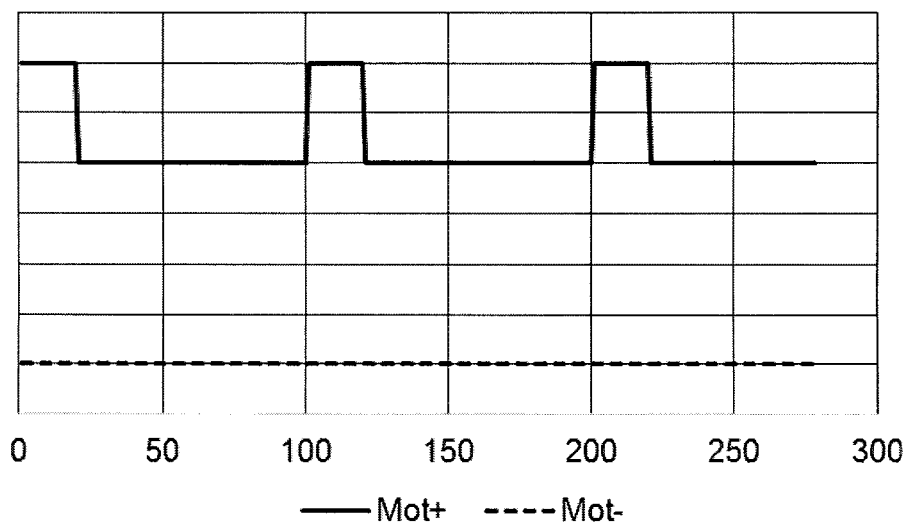
Figure 3C:
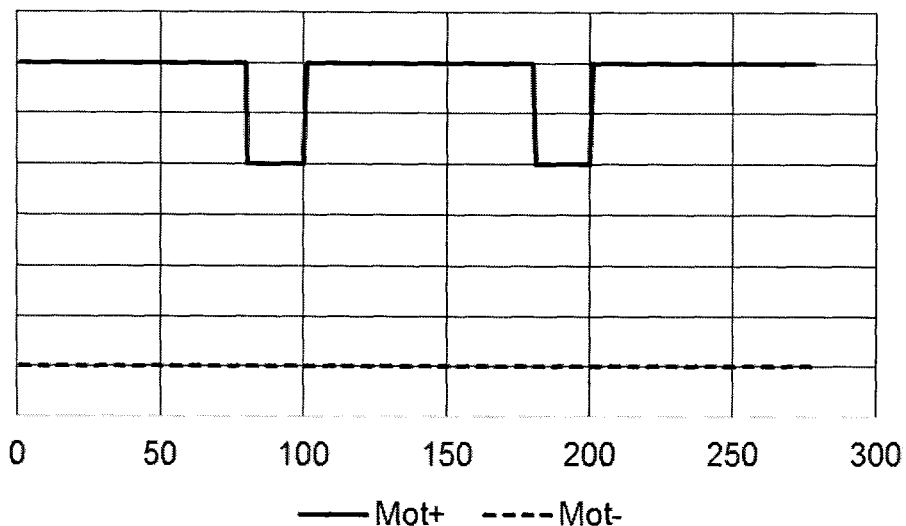

In all phases except for the position adjustment phase, preferably only one pole of the motor 10 is regulated, while the other pole is connected to a negative or to a positive polarity. In these phases, a rotation in an opposite direction is not required, and therefore only one pole needs to be regulated. FIGS. 3A to 3C show examples of signal shapes outputted by the motor drive unit 15 of FIG. 1 to the Mot+ and Mot− poles of the motor 10, and these signal shapes apply in the first five phases of the method according to the disclosure with various pulse widths. FIG. 3A shows the signal shapes in the case of 50% PWM, FIG. 3B applies to 20% PWM and FIG. 3C to 80% PWM.

In the position adjustment phase, preferably both poles of the motor 10 are regulated in a way that inverse AC signals are fed to the two poles, and the rotation of the motor 10 is defined by the duty cycle of the AC signal. In the last phase both poles are thus regulated, and the two poles receive the inverse signals of each other. In this case the motor 10 vibrates very gently, which cannot be sensed due to the inertias, and therefore it will not shake the sample in a centrifuged cuvette for example. However, an adhesive friction is thereby eliminated and hence the motor 10 can be precisely regulated even at low speeds of rotation.

Figure 4A:
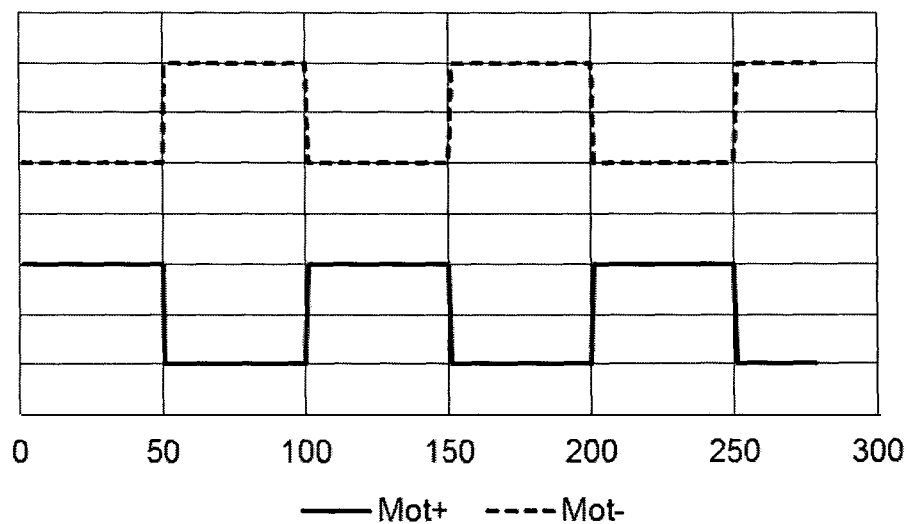
Figure 4B:
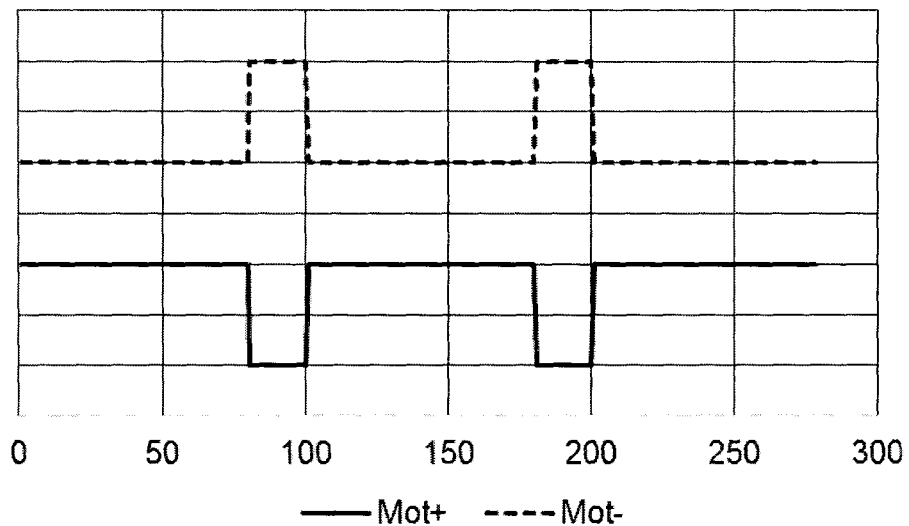
Figure 4C:
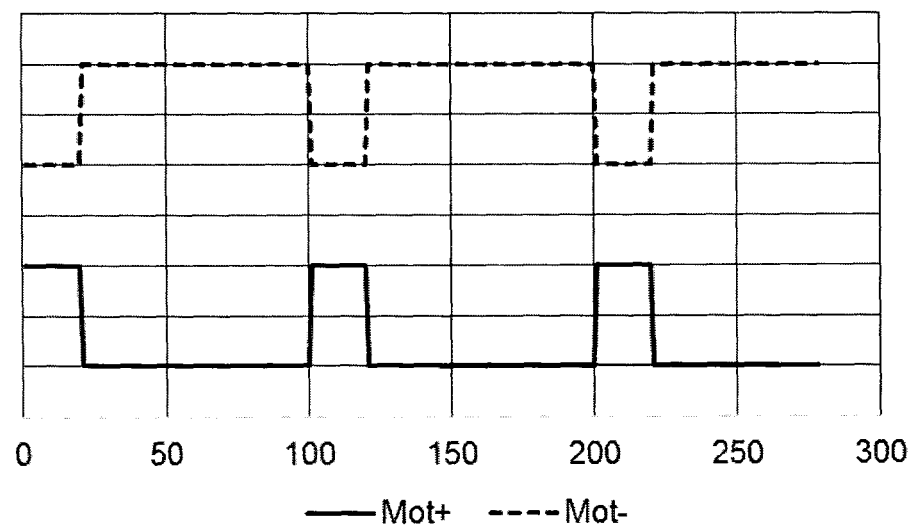

FIGS. 4A to 4C show examples of signal shapes with various duty cycles outputted by the motor drive unit 15 to the Mot+ and Mot− poles of the motor 10, which signal shapes apply in the sixth phase of the control method according to the disclosure. FIG. 4A depicts a 50% PWM AC signal, where the motor 10 is idle. FIG. 4B shows an 80% PWM AC signal, where the motor 10 spins to the right. FIG. 4C shows a 20% PWM AC signal, where the motor 10 spins to the left.

In this phase the imp signal has a sign, i.e. it depends on the direction of rotation. The direction of rotation comes preferably from the direction sensor 13. In the implementation, the function fpwmacmot sets the duty cycle of a constant frequency signal, and said duty cycle may vary between 0 and 100%. According to the discussion above, the motor is idle at 50%, spins clockwise between 0 and 50%, and spins counter-clockwise between 50 and 100%. The values 0% and 100% correspond to a maximum power.

The disclosure also relates to a centrifuge, which comprises the motor 10, the pulse-emitting angle sensor 11 coupled to the motor 10, the motor drive unit 15 which drives the motor 10, and the control unit 14 which supplies to the motor drive unit 15 the control signal for determining the desired motion of the centrifuge. The control unit 14 carries out the method discussed above.

The disclosure is furthermore a computer program which, when is executed by one or more computers, includes instructions for executing the method described above, and furthermore a storage medium, on which the computer program for executing the centrifuge control method is stored, and the stored data and instructions carry out the method described above when the program is executed by a computer.

The disclosure is of course not limited to the preferred embodiments demonstrated by examples in details, but further versions and alternatives are possible within the scope of protection defined by the claims. In the preferred value ranges appearing in Table 1 below, the values of various parameters and constants are to be adjusted to the actual application, to the statics and dynamics of the given centrifuge, and to its desired behaviour, preferably by estimation and/or by experiments.

TABLE 1

Expressions and constants

| Names | Minimal value | Maximal value | Description |
|---|---|---|---|
| i | N/A | N/A | Absolute motor position in angle sensor pulses |
| $\Delta t_i$ | N/A | N/A | Time difference between two angle sensor pulses |
| Pwm | N/A | N/A | Pwm signal fed to the motor drive unit |
| Pwmmot | N/A | N/A | Pwm signal (control signal value) to be fed to the motor drive unit |
| fpwmmot | N/A | N/A | Calculating function of the pwm signal |
| fsetvalue | N/A | N/A | Calculating function of the regulating set-value |
| $t_{ierror}$ | N/A | N/A | Deviation time difference of two angle sensor pulses, from the ideal |
| ncent | 500 rpm | 10000 rpm | Stabilised centrifuge rotational speed |
| $t_{minrot}$ | 80 ms | 1 ms | Time difference of sensor pulses at the lowest speed |
| Pwmmin | Measured upon init. | Measured upon it. | Pwm belonging to the lowest speed |
| $t_{cent}$ | 300 us | 15 us | Time difference of the sensor pulses at the stabilised centrifugation speed |
| $Pwm_{ncent}$ | Measured upon init. | Measured upon it. | Pwm associated with the stabilised centrifugation speed |
| $X_{start}$ | 5 | 500 | Time of position regulated acceleration in pulses |
| $t_{accel}$ | 100 ms | 1 s | Time of regulated acceleration |
| $X_{accel}$ | 500 | 5000 | Time of regulated acceleration in pulses |
| $Setvalue_{offs}$ | 0 | 10000 | Set-value calculation offset of regulated acceleration |
| $Setvalue_{amp}$ | >0 | 1000000 | Set-value calculation amplification of regulated acceleration |
| $Setvalue_{div1}$ | >0 | 10000 | Set-value divisor of reg. acceleration pwm calculation |
| $Setvalue_{div2}$ | >0 | 10000 | Set-value divisor of reg.acceleration pwm calculation |
| $X_{accelH}$ | 500 | 5000 | Base value of position of reg.acceleration pwm calculation |
| $X_{accelL}$ | 500 | 5000 | Base value of position of reg.acceleration pwm calculation |
| $DiV_{accelH}$ | 1 | 10000 | Error signal divisor of reg.acceleration pwm calculation |
| $DiV_{accelL}$ | 1 | 10000 | Error signal divisor of reg.acceleration pwm calculation |
| $t_{centhold}$ | 100 ms | 5 min | Time period of stabilised centrifugation |
| $X_{hold}$ | 1333 | 4000000 | Time period of stabilised centrifugation in pulses |
| $t_{hold}$ | 4800 | 240 | Sensor pulse time at a stabilised centrifugation speed measured in a processor clock signal |
| $Hold_{amp}$ | 0 | 10000 | Amplification of the error signal at the stabilised centrifugation speed |
| $X_{decel1}$ | 500 | 5000 | First deceleration phase time in pulses |
| $Setvalue_{ampdecel1}$ | 100 | 100000 | Set-value amplification of the first deceleration phase |
| $Setvalue_{div1\|1}$ | >0 | 10000 | Set-value divisor of the first deceleration phase pwm calculation |
| $Setvalue_{div2\|1}$ | >0 | 10000 | Set-value divisor of the first deceleration phase pwm calculation |
| $DiV_{decel1H}$ | 1 | 10000 | Error signal divisor of first deceleration phase pwm calculation |
| $DiV_{decel1L}$ | 1 | 10000 | Error signal divisor of first deceleration phase pwm calculation |
| $X_{decel2}$ | ≥10 | 1000 | Time of second (gentle) deceleration phase in pulses |
| $Div_{decel2}$ | >1 | 100 | Base value divisor of second deceleration phase |
| $Setvalue_{ampdecel2}$ | 100 | 100000 | Set-value multiplier of second deceleration phase |
| $Setvalue_{offadecel2}$ | 1 | 10000 | Set-value offset of second deceleration phase |
| $Div_{decel2sv}$ | >0 | 1000 | Set-value pulse divisor of second deceleration phase |
| $Div_{decel2pwm}$ | >0 | 1000 | Pwm divisor of second deceleration phase |
| $Setvalue_{ampdecel3}$ | >0 | 100 | Amplification of a third (positioning) deceleration phase |
| $Pwm_{start}$ | 0 | 256 | Initial pwm signal of third deceleration phase |
| $Pwm_{decel3}$ | 0 | 256 | Pwm offset of third deceleration phase |

The invention claimed is:

1. A control method for a centrifuge having a motor that is driven by a motor drive unit and a control signal determining a desired motion of the centrifuge supplied by a control unit to the motor drive unit and wherein pulses of an angle sensor coupled to the motor are utilised in the control method, characterised by the following consecutive phases between a starting and a stopping of the centrifuge comprising:

performing a starting phase, in which the control signal is determined using a motor position determined by pulses received from the angle sensor, performing a regulated acceleration phase, in which the control signal is determined using the motor position and a time difference between the pulses received from the angle sensor, performing a holding phase, in which a pre-determined centrifugation speed is held by determining the control signal using the time difference between the pulses received from the angle sensor, performing a regulated deceleration phase, in which the control signal is determined using the motor position and the time difference between the pulses received from the angle sensor, performing a regulated gentle deceleration phase, in which the control signal is determined using the motor position and the time difference between the pulses received from the angle sensor, wherein the time difference is given a lower weight in the regulated gentle deceleration phase than in the regulated deceleration phase, and performing a position adjustment phase, in which the control signal is determined using the motor position.

2. The method according to claim 1 wherein the control signal is a pulse width modulation signal having a digital value.

3. The method according to claim 2, the performance of the starting phase further comprising:

determining a value of the control signal according to equations as follows:

$$Pwmmot = \text{fpwmmot\_SP}(i)$$

$$i = \sum_{n=1}^{X_{start}} imp$$

$$\text{fpwmmot\_SP}(0) = Pwmmin$$

where

Pwmmot is the value of the control signal, i is a sum of pulses (imp) detected from motor start up to an actual position, fpwmmot_SP is a function determining the value of the control signal in the starting phase, $X_{start}$ is a length of the starting phase measured in pulses, and Pwmmin is a control signal value associated with an initial rotation, wherein in the starting phase the value of the control signal is determined as follows:

If $\Delta t_i < t_{Max}$ then $fpwmmot\_SP(i) = fpwmmot\_SP(i-1)$

If $\Delta t_i \geq t_{Max}$ then $fpwmmot\_SP(i) = fpwmmot\_SP(i-1)+1$ where $t_{Max}$ is a time elapsing between two pulses associated with a desired maximum rotation in the starting phase, and $\Delta t_i$ is a time elapsed between a pulse and a previous pulse.

4. The method according to claim 2, the performance of the regulated acceleration phase further comprising:

determining a value of the control signal using:

a value of a set-value function determined by the position and the time difference between the pulses according to equations as follows:

$$Pwmmot = fpwmmot\_AP(\text{fsetvalue\_AP}(i), \Delta t_i)$$

$$\Delta t_i = t_i - t_{i-1}$$

where

Pwmmot is the value of the control signal, fpwmmot_AP is a function determining the value of the control signal in the regulated acceleration phase, fsetvalue_AP is the set-value function of the regulated acceleration, $\Delta t_i$ is the time elapsed between a pulse and a previous pulse, and i is a sum of pulses detected from motor start up to a current position and is defined as:

$$i = \sum_{n=1}^{X_{start}} imp$$

wherein in the regulated acceleration phase, the value of the control signal is determined as follows:

$$\text{fsetvalue\_AP}(i) = Setvalue_{offs} + (Setvalue_{amp}/i)$$

$$t_{i_{error}} = \Delta t_i - \text{fsetvalue\_AP}(i)$$

if $t_{i_{error}} < 0$ then $$\text{fpwmmot\_AP}(i) = \frac{i}{Setvalue_{div1}} + \left(\frac{t_{i_{error}}}{\frac{X_{accelH} - i}{Div_{accelH}}}\right)$$

if $t_{i_{error}} \geq 0$ then $$\text{fpwmmot\_AP}(i) = \frac{i}{Setvalue_{div2}} + \left(\frac{t_{i_{error}}}{\frac{X_{accelL} - i}{Div_{accelL}}}\right)$$

where constants in the formulae are as follows:

$Setvalue_{offs}$ is an offset from a regulated acceleration set-value calculation, $Setvalue_{amp}$ is an amplification of the regulated acceleration set-value calculation, $Setvalue_{div1}$ is a set-value divisor of a regulated acceleration pwm calculation, $Setvalue_{div2}$ is a set-value divisor of the regulated acceleration pwm calculation, $X_{accelH}$ is a first base value of a position corresponding to the regulated acceleration pwm calculation, $X_{accelL}$ is a second base value of the position corresponding to the regulated acceleration pwm calculation, $Div_{accelH}$ is a first error signal divisor of the regulated acceleration pwm calculation, $Div_{accelL}$ is a second error signal divisor of the regulated acceleration pwm calculation.

5. The method according to claim 2, the performance of the holding phase further comprising:

determining a value of the control signal according to an equation as follows:

$$Pwmmot = fpwmmot\_HP(\Delta t_i)$$

where

Pwmmot is the value of the control signal, fpwmmot_HP is a function determining the value of the control signal in the holding phase, and $\Delta t_i$ is the time elapsed between a pulse and a previous pulse, wherein in the holding phase the value of the control signal is determined as follows:

$$t_{i_{error}} = \Delta t_i - t_{hold}$$

$$fpwmmot\_HP(i) = \text{Hold}_{amp} * t_{i_{error}} + Pwm_{ncent}$$

where constants in the formulae are as follows:
$t_{hold}$ is a time interval of pulses associated with a stabilised holding centrifugation speed, measured with a processor clock signal,
i is a sum of pulses detected from motor start up to a current position and is defined as:

$$i = \sum_{n=1}^{X_{start}} imp$$

$Hold_{amp}$ is an amplification of an error signal associated with the stabilised holding centrifugation speed, and
$Pwm_{ncent}$ is a control signal value associated with the stabilised holding centrifugation speed.

6. The method according to claim 2, the performance of the regulated deceleration phase further comprising:
determining a value of the control signal using
a value of a set-value function defined by the position and
the time difference between the pulses
according to an equation as follows:

$Pwmmot = fpwmmot\_DP(f setvalue\_DP(i), \Delta t_i)$ where
Pwmmot is the value of the control signal,
fpwmmot_DP is a function determining the value of the control signal in the regulated deceleration phase,
fsetvalue_DP is the set-value function of the regulated deceleration,
i is a sum of pulses detected from motor start up to a current position and is defined as:

$$i = \sum_{n=1}^{X_{start}} imp,$$

and
$\Delta t_i$ is the time elapsed between a pulse and a previous pulse,
wherein in the regulated deceleration phase the value of the control signal is determined as follows:

$$fsetvalue\_DR(i) = t_{hold} + \left( \frac{Setvalue_{ampdecel1}}{X_{decel1} - i} \right)$$

$t_{i_{error}} = \Delta t_i - fsetvalue\_DR(i)$ if $t_{i_{error}} < 0$ then $$fpwmmot\_DR(i) = \frac{i}{Setvalue_{div1l1}} + \left( \frac{\frac{t_{i_{error}}}{i}}{Div_{decel1H}} \right)$$

if $t_{i_{error}} \geq 0$ then $$fpwmmot\_DR(i) = \frac{i}{Setvalue_{div2l1}} + \left( \frac{\frac{t_{i_{error}}}{i}}{Div_{decel1L}} \right)$$

where constants in the formulae are as follows:
Pwmmot is the value of the control signal,
$X_{decel1}$ is a time of the regulated deceleration phase measured in pulses,
$Setvalue_{ampdecel1}$ is a set-value amplification of the regulated deceleration phase,
$Setvalue_{div1l1}$ is a first set-value divisor of the regulated deceleration phase pwm calculation,
$Setvalue_{div2l1}$ is a second set-value divisor of the regulated deceleration phase pwm calculation,
$Div_{decel1H}$ is a first error signal divisor of the regulated deceleration phase pwm calculation,
$Div_{decel1L}$ is a second error signal divisor of the regulated deceleration phase pwm calculation, and
$t_{hold}$ is a time interval of pulses associated with a stabilised holding centrifugation speed, measured with a processor clock signal.

7. The method according to claim 2, the performance of the regulated gentle deceleration phase further comprising:
determining a value of the control signal using
a value of a set-value function determined by the position and
the time difference between pulses
according to the following equations $Pwmmot = fpwmmot\_GDR(fsetvalue\_GDR(i), \Delta t_{i\_GDP})$ $$\Delta t_{i\_GDP} = \frac{(t_i - t_{i-1})}{Div_{decel2}}$$

where
Pwmmot is the value of the control signal,
fpwmmot_GDP is a function determining the value of the control signal in the regulated gentle deceleration phase,
fsetvalue_GDP is the set-value function of the regulated gentle deceleration,
$\Delta t_{i\_GDP}$ is a quotient of the time difference between a pulse and a previous pulse and a $Div_{decel2}$ constant which is greater than one and ≤100, and
i is a sum of pulses detected from motor start up to a current position and is defined as:

$$i = \sum_{n=1}^{X_{start}} imp$$

wherein in the regulated gentle deceleration phase the value of the control signal is determined as follows:

$$fsetvalue\_GDR(i) = \left( \frac{Setvalue_{ampdecel2}}{Setvalue_{offdecel2} - \frac{i}{Div_{decel2sv}}} \right)$$

$t_{i_{error}} = \Delta t_{i\_GDP} - fsetvalue\_GDR(i)$ $$fpwmmot\_GDP = \left( \frac{\frac{t_{i_{error}}}{i}}{1 + \frac{i}{Div_{decel2pwm}}} \right)$$

where constants in the formulae are as follows:

Setvalue$_{ampdecel2}$ is a set-value multiplier of the gentle deceleration phase, Setvalue$_{offsdecel2}$ is a set-value offset of the gentle deceleration phase, Div$_{decel2sv}$ is a set-value pulse divisor of the gentle deceleration phase, Div$_{decel2pwm}$ is a pwm divisor of the gentle deceleration phase.

8. The method according to claim 2, the performance of the position adjustment phase further comprising:

determining a value of the control signal according to the following an equation as follows:

Pwmacmot=fpwmacmot(i)

where

Pwmacmot is a value of the control signal in the position adjustment phase, fpwmacmot is a function determining the value of the control signal in the position adjustment phase, and i is a sum of pulses detected from motor start up to a current position and is defined as:

$$i = \sum_{n=1}^{X_{start}} imp$$

wherein in the position adjustment phase the value of the control signal is determined as follows:

fpwmacmot(0)=Pwm$_{start}$ fpwmmot(i)=Pwm$_{decel3}$−i*Setvalue$_{ampdecel3}$ where constants in the formulae are as follows:

Pwm$_{Start}$ is an initial pwm signal of the position adjustment phase,

Pwm$_{decel3}$ is a pwm offset of the position adjustment phase,

Setvalue$_{ampdecel3}$ is an amplification of the position adjustment phase and fpwmmot is a calculating function of the pulse width modulation signal.

9. The method according to claim 1 further comprising:

regulating in each said phase except the position adjustment phase only one pole of the motor, while the other pole is connected to a negative or to a positive polarity, and regulating in the position adjustment phase both poles of the motor so that an AC signal is supplied to one of the poles and an inverse of the AC signal is supplied to the other pole, and rotation of the motor is determined by a duty cycle of the AC signal.

10. A centrifuge comprising:

a motor;

a pulse-emitting angle sensor coupled to the motor;

a motor drive unit coupled to the motor; and a control unit coupled to the motor drive unit, the control unit generating a control signal that is used by the motor drive unit to drive a motion of the motor, the control unit generating the control signal by using a position of the motor determined by pulses received from the angle sensor during a starting phase;

using the position of the motor and a time difference between the pulses received from the angle sensor during a regulated acceleration phase;

using the time difference between the pulses received from the angle sensor to hold the motor at a predetermined centrifugation speed during a holding phase;

using the position of the motor and the time difference between the pulses received from the angle sensor during a regulated deceleration phase;

using the position of the motor and the time difference between the pulses received from the angle sensor during a regulated gentle deceleration phase in which the time difference is given a lower weight than the time difference is given in the regulated deceleration phase; and using the position of the motor during a position adjustment phase.

11. A non-transitory computer readable storage medium on which instructions of a computer program are stored that when executed by a computer operating a motor in a centrifuge cause the computer to:

use a position of the motor determined by pulses received from an angle sensor coupled to the motor during a start phase to generate a control signal for a motor control unit that is coupled to the motor to drive a motion of the motor;

use the position of the motor and a time difference between the pulses received from the angle sensor to generate the control signal for the motor control unit during a regulated acceleration phase;

use the time difference between the pulses received from the angle sensor to generate the control signal for the motor control unit to hold a speed of the motor at a predetermined centrifugation speed during a holding phase;

use the position of the motor and the time difference between the pulses received from the angle sensor to generate the control signal for the motor control unit during a regulated deceleration phase;

use the position of the motor and the time difference between the pulses received from the angle sensor to generate the control signal for the motor control unit during a regulated gentle acceleration phase, wherein the time difference is given a lower weight in the regulated gentle deceleration phase than in the regulated deceleration phase; and use the position of the motor to generate the control signal for the motor control unit during a position adjustment phase.

\* \* \* \* \*